United States Patent
Ramalho

(10) Patent No.: US 12,526,316 B2
(45) Date of Patent: Jan. 13, 2026

(54) SYSTEMS AND METHODS FOR AN ACOUSTIC COMMUNICATION AS AN OUT-OF-BAND FACTOR IN A MULTI-FACTOR AUTHENTICATION FRAMEWORK

(71) Applicant: Michael A. Ramalho, Lakewood Ranch, FL (US)

(72) Inventor: Michael A. Ramalho, Lakewood Ranch, FL (US)

(*) Notice: Subject to any disclaimer, the term of this patent is extended or adjusted under 35 U.S.C. 154(b) by 0 days.

(21) Appl. No.: 19/002,640

(22) Filed: Dec. 26, 2024

(65) Prior Publication Data
US 2025/0220046 A1    Jul. 3, 2025

Related U.S. Application Data

(60) Provisional application No. 63/614,885, filed on Dec. 26, 2023.

(51) Int. Cl.
*H04L 9/40* (2022.01)
*H04B 11/00* (2006.01)

(52) U.S. Cl.
CPC ............. *H04L 63/18* (2013.01); *H04B 11/00* (2013.01); *H04L 63/067* (2013.01); *H04L 63/105* (2013.01)

(58) Field of Classification Search
CPC ..... H04L 63/18; H04L 63/067; H04L 63/105; H04B 11/00
See application file for complete search history.

(56) References Cited

U.S. PATENT DOCUMENTS

| 6,345,073 B1 * | 2/2002 | Curry | H03M 13/2732 375/147 |
| 11,159,507 B2 * | 10/2021 | Pham | G06Q 20/3821 |

(Continued)

OTHER PUBLICATIONS

WearLock: Unlocking Your Phone via Acoustics Using Smartwatch, Yi et al, Jun. 2017 (Year: 2017).*

*Primary Examiner* — Jahangir Kabir
(74) *Attorney, Agent, or Firm* — Mooney IP

(57) ABSTRACT

The present disclosure relates to systems and methods for performing out-of-band authentication in multi-factor authentication (MFA) frameworks utilizing acoustic communication channels. Specifically, the invention employs a cross-platform acoustic transport protocol to convey authentication information between a device requiring authentication and a roaming authenticator device. Acoustic communications utilize existing hardware—speakers and microphones—on both devices and operate within an acoustic bandwidth from a few hundred hertz to low ultrasound frequencies, rendering the transmissions imperceptible to users. To enhance security, the system employs acoustic spread-spectrum technology, including acoustic discrete-sequence spread-spectrum techniques with programmable synchronization codes that change with each authentication. This method provides secure, seamless, and user-friendly authentication without interrupting user workflow. By leveraging acoustic signals as an out-of-band factor, the invention overcomes limitations of traditional MFA methods that rely on user participation or are susceptible to electromagnetic interference, thereby improving security and user experience across various technical environments.

19 Claims, 8 Drawing Sheets

(56) References Cited

U.S. PATENT DOCUMENTS

2018/0091565 A1\* 3/2018 Arsenault ............... H04L 67/02
2020/0382481 A1\* 12/2020 Pham ................. G06Q 20/3272

\* cited by examiner

```
┌─────────────────────────────────────────────────────┐
│ Providing a device requiring authentication and reauthentication within │
│ a zero-trust framework session or work environment, a cross-platform    │
│ acoustic transport protocol to convey out-of-band authentication        │──── 810
│ information over an acoustic channel between the device requiring       │
│ authentication and a roaming authenticator hardware device, wherein     │
│ acoustic communications over the acoustic channel utilize hardware      │
│ present on the device requiring authentication and the roaming          │
│ authenticator hardware device                                           │
└─────────────────────────────────────────────────────┘
                              │
                              ▼
┌─────────────────────────────────────────────────────┐
│ Utilizing, by the device requiring authentication and the roaming       │
│ authenticator device, part of an acoustic bandwidth from ten thousand   │──── 820
│ hertz to low ultrasound frequencies for the acoustic communications     │
└─────────────────────────────────────────────────────┘
                              │
                              ▼
┌─────────────────────────────────────────────────────┐
│ Employing, by the device requiring authentication and the roaming       │
│ authenticator device, acoustic spread-spectrum technology to transmit   │
│ authentication data over the acoustic channel from the authenticator    │──── 830
│ hardware device to the device requiring authentication and              │
│ reauthentication, wherein the authentication is performed continuously  │
│ and imperceptibly to a user within a zero-trust framework               │
└─────────────────────────────────────────────────────┘
```

FIG. 8

SYSTEMS AND METHODS FOR AN ACOUSTIC COMMUNICATION AS AN OUT-OF-BAND FACTOR IN A MULTI-FACTOR AUTHENTICATION FRAMEWORK

REFERENCE TO RELATED APPLICATIONS

This application claims priority from U.S. provisional application Ser. No. 63/614,885, filed Dec. 26, 2023, which is incorporated by reference.

BACKGROUND OF THE INVENTION

This application relates to acoustic multi-factor authentication innovations which protect security and improve user experience in zero-trust and similar security arrangements.

TECHNICAL FIELD

The present disclosure generally relates to authentication systems and methods, and more particularly to multi-factor authentication (MFA) processes for securing access to resources with an out of band (OOB) acoustic channel within various technical environments, including the increasingly prevalent "Zero-Trust Framework" (ZTF) authentication arrangements.

DESCRIPTION OF THE RELATED ART

Existing solutions to the problem being solved often rely on traditional MFA techniques that require active user participation, such as entering codes from hardware tokens or responding to prompts on secondary devices, which can interrupt user workflow and may not provide optimal security.

SUMMARY OF THE INVENTION

In some aspects, the techniques described herein relate to a method for performing out-of-band authentication in a multi-factor authentication framework, including: using, by a device requiring authentication, a cross-platform acoustic transport protocol to convey out-of-band authentication information over an acoustic channel between the device requiring authentication and a roaming authenticator device; wherein acoustic communications over the acoustic channel utilize hardware present on the device requiring authentication and the roaming authenticator device; utilizing, by the device requiring authentication and the roaming authenticator device, an acoustic bandwidth from approximately a few hundred hertz to low ultrasound frequencies for the acoustic communications; and employing, by the device requiring authentication and the roaming authenticator device, acoustic spread-spectrum technology to transmit authentication data over the acoustic channel.

In many aspects, this disclosure addresses an authentication factor using an OOB authentication different from the primary communications channel. Specifically, one using acoustic communications between the device requiring authentication (e.g., a laptop) and another device that either the user owns (e.g., their smartphone), that the user trusts (e.g., hardware that they or their employer administers at their home or office), or that is trusted by an application needing additional authentication (e.g., application-specific hardware at a known physical location. In WebAuthn parlance, this type of communications channel-based authentication is known as authentication via use of a "roaming authenticator". The authentication via the roaming authenticators proposed herein employs a non-standardized cross-platform acoustic transport protocol.

This disclosure specifically addresses improving the user experience associated with the periodic re-authentications required to maintain or regain access to a desired resource in a ZTF or similar security arrangement. In this sort of environment, the user typically concentrates on the task at hand over the primary communications channel (e.g., a remote cloud-based desktop application) and has to take their mental focus off this primary task to periodically reauthenticate. As the re-authentication mechanism is often OOB (e.g., entering a one-time password authentication code), it often requires the user to shift focus to reauthenticate before returning to their primary task. This mental interruption often exacts a productivity toll in that it may take many minutes for the user to fully regain mental focus and to return back to the task at hand. Such interruptions can also increase work errors as well as increase irritability. This invention enables the acoustics-based re-authentication process to be seamless and minimally invasive or imperceptible to the user with the tangible benefits of an improved user experience (no mental interruptions) while also admitting the possibility of more frequent re-authentication (resulting in an even-more secure environment).

In many aspects, MFA can be present at either the device level or the application level or both. An example of the former is for the entire device to obtain access to a local network or to specific applications in a private network (e.g., many virtual private network use cases). An example of the latter is to gain access to a database intended only to be accessed by specific individuals. Many corporate ZTF environments apply MFA at device and/or application levels, and in some instances, one or both are integrated into corporate authentication architecture whereby the authentication is used for both purposes for a specific user.

In some aspects, the techniques described herein relate to a method, wherein the acoustic communications have an authentication response that changes with each authentication.

In some aspects, the techniques described herein relate to a method, wherein the acoustic bandwidth used for the acoustic communications is in a low ultrasound range such that the out-of-band authentication over the cross-platform acoustic transport protocol is not audible to humans with normal hearing.

In some aspects, the techniques described herein relate to a method, wherein the acoustic spread-spectrum technology includes acoustic discrete-sequence spread-spectrum technology.

In some aspects, the techniques described herein relate to a method, wherein synchronization codes or information-bearing symbols used in the acoustic discrete-sequence spread-spectrum technology are changeable and programmable on subsequent authentications.

In some aspects, the techniques described herein relate to a method, further including performing an initial authentication over the cross-platform acoustic transport protocol.

In some aspects, the techniques described herein relate to a method, wherein an initial authentication occurs using an authentication mechanism other than the cross-platform acoustic transport protocol, and subsequent authentications use the cross-platform acoustic transport protocol.

In some aspects, the techniques described herein relate to a method, wherein the device requiring authentication is selected from the group consisting of a laptop computer, a tablet computer, a smartphone, or an application running on such a device.

In some aspects, the techniques described herein relate to a method, wherein the roaming authenticator device is selected from the group consisting of: a smartphone; an audio, video, or multimedia endpoint; a monitor or television endpoint having networking and acoustic transmission capabilities; an embedded system hardware device connected to a monitor or television endpoint; and a standalone embedded system hardware device.

In some aspects, the techniques described herein relate to a method, wherein the acoustic communications occur within an acoustic volume, the acoustic volume being a physical space within which acoustic information transfer takes place between the device requiring authentication and the roaming authenticator device.

In some aspects, the techniques described herein relate to a method, wherein the acoustic volume is configured such that acoustic signals do not propagate at sufficient loudness or fidelity to be received outside of the acoustic volume, thereby ensuring authentication occurs within a specific physical space.

In some aspects, the techniques described herein relate to a system for performing out-of-band authentication in a multi-factor authentication framework, including: a device requiring authentication, including: at least one processor; a speaker; a microphone; and a roaming authenticator device, including: at least one processor; a speaker; a microphone; wherein the device requiring authentication and the roaming authenticator device are configured to use a standardized or non-standardized cross-platform acoustic transport protocol to convey out-of-band authentication information over an acoustic channel between them; wherein acoustic communications over the acoustic channel utilize hardware present on the device requiring authentication and the roaming authenticator device; wherein the device requiring authentication and the roaming authenticator device utilize an acoustic bandwidth from approximately a few hundred hertz to low ultrasound frequencies for the acoustic communications; and wherein the device requiring authentication and the roaming authenticator device employ acoustic spread-spectrum technology to transmit authentication data over the acoustic channel.

In some aspects, the techniques described herein relate to a system, wherein the acoustic communications have an authentication response that changes with each authentication.

In some aspects, the techniques described herein relate to a system, wherein the acoustic spread-spectrum technology includes acoustic discrete-sequence spread-spectrum technology, and wherein synchronization codes or information-bearing symbols used in the acoustic discrete-sequence spread-spectrum technology are changeable and programmable on subsequent authentications.

In some aspects, the techniques described herein relate to a system, wherein the acoustic bandwidth used for the acoustic communications is in a low ultrasound range such that the out-of-band authentication over the cross-platform acoustic transport protocol is not audible to humans with normal hearing.

In some aspects, the techniques described herein relate to a system, wherein: the device requiring authentication is selected from the group consisting of a laptop computer, a tablet computer, a smartphone, or an application running on such a device; the roaming authenticator device is selected from the group consisting of: a smartphone; an audio, video, or multimedia endpoint; a monitor or television endpoint having networking and acoustic transmission capabilities; an embedded system hardware device connected to a monitor or television endpoint; and a standalone embedded system hardware device.

In some aspects, the techniques described herein relate to a computer program product including a non-transitory computer-readable storage medium storing instructions that, when executed by one or more processors of a device requiring authentication and a roaming authenticator device, cause the processors to perform operations including: facilitating, by the device requiring authentication and the roaming authenticator device, out-of-band authentication in a multi-factor authentication framework by conveying out-of-band authentication information over an acoustic channel between the device requiring authentication and the roaming authenticator device using a standardized or non-standardized cross-platform acoustic transport protocol; utilizing hardware present on the device requiring authentication and the roaming authenticator device for acoustic communications over the acoustic channel; utilizing an acoustic bandwidth from approximately a few hundred hertz to low ultrasound frequencies for the acoustic communications; and employing acoustic spread-spectrum technology to transmit authentication data over the acoustic channel.

In some aspects, the techniques described herein relate to a computer program product, wherein the acoustic communications have an authentication response that changes with each authentication.

In some aspects, the techniques described herein relate to a computer program product, wherein the acoustic spread-spectrum technology includes acoustic discrete-sequence spread-spectrum technology, and wherein synchronization codes or information-bearing symbols used in the acoustic discrete-sequence spread-spectrum technology are changeable and programmable on subsequent authentications.

In some aspects, the techniques described herein relate to a computer program product, wherein the acoustic bandwidth used for the acoustic communications is in a low ultrasound range such that the out-of-band authentication over the cross-platform acoustic transport protocol is not audible to humans with normal hearing.

BRIEF DESCRIPTION OF THE FIGURES

The appended figures depict certain features of the various aspects described herein and are not to be considered limiting of the scope of this disclosure.

FIG. 8 depicts a flowchart of an example method for performing out-of-band authentication in a multi-factor authentication framework.

DETAILED DESCRIPTION

Figure 1:
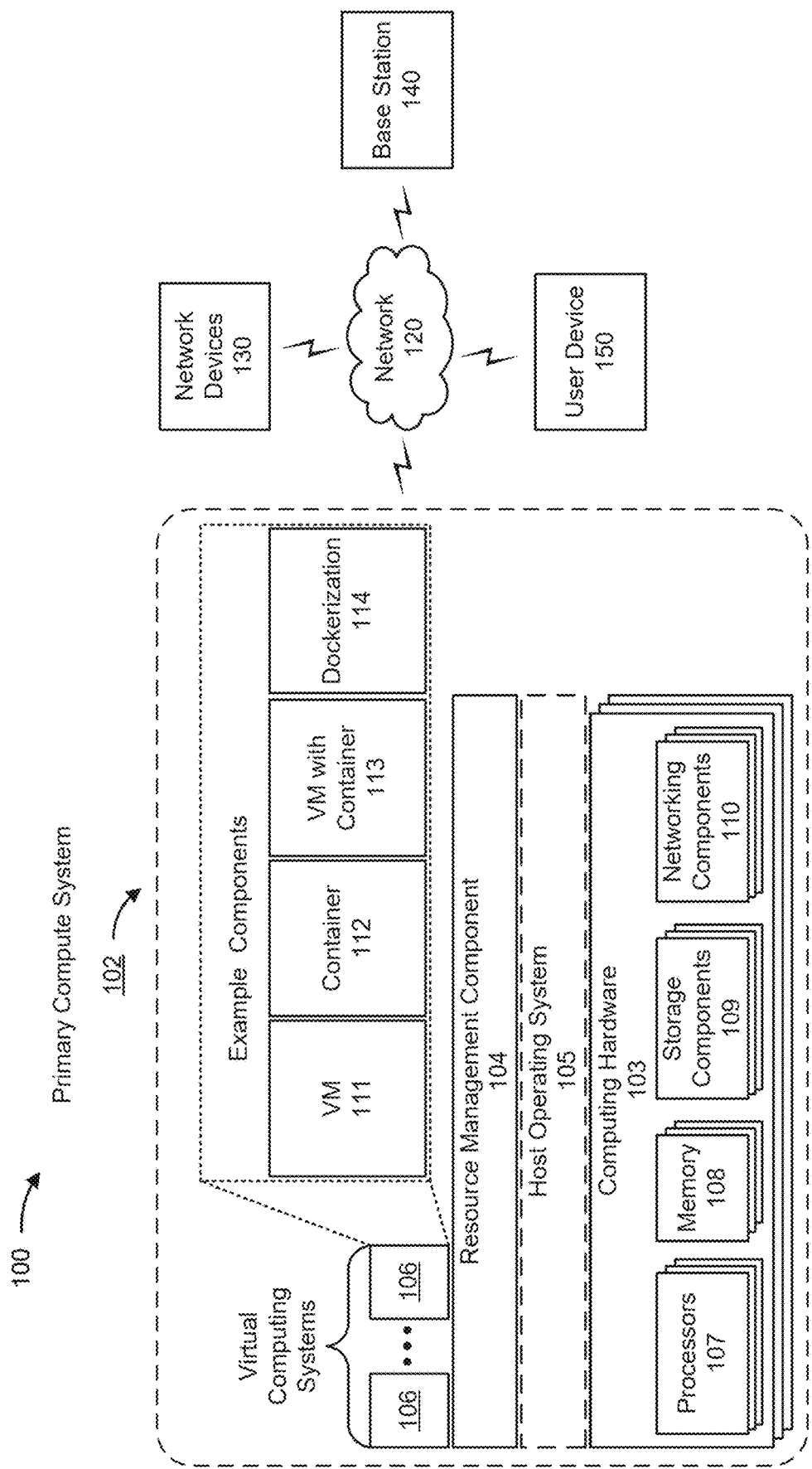
FIG. 1 depicts a block diagram of a data processing environment in which illustrative embodiments may be implemented.

Aspects of the present disclosure provide apparatuses, methods, processing systems, and computer-readable mediums for improving multi-factor authentication (MFA) processes by utilizing acoustic communication channels as an out-of-band authentication factor. Conventional MFA methods often rely on electromagnetic communication channels or require active user participation, such as entering codes or responding to prompts on secondary devices. These approaches can be susceptible to security vulnerabilities like interception or replay attacks, may disrupt user experience, and can decrease productivity due to frequent interruptions.

To address these challenges, aspects presented herein provide improved techniques for performing out-of-band authentication in MFA frameworks using acoustic communication technology. As described in more detail below, the system employs a cross-platform acoustic transport protocol to convey authentication information between a device requiring authentication and a roaming authenticator device. By utilizing acoustic spread-spectrum technology and operating within frequencies from a few hundred hertz to low ultrasound frequencies, the authentication process becomes secure, seamless, and imperceptible to users. The use of programmable synchronization codes and dynamic authentication responses further enhances security by making the system resistant to eavesdropping and replay attacks.

The following description provides examples of systems and methods for performing out-of-band authentication using acoustic communication channels in various technical environments. The disclosed embodiments are illustrative and not limiting of the scope, applicability, or examples set forth in the claims. Modifications may be made in the function and arrangement of elements without departing from the scope of the disclosure. Various examples may omit, substitute, or add procedures or components as appropriate. For instance, the methods described may be performed in an order different from that presented, and steps may be added, omitted, or combined. Features described with respect to some examples may be combined in other examples. An apparatus may be implemented or a method practiced using any number of aspects set forth herein. The scope of the disclosure is intended to cover such apparatuses or methods practiced using other structures, functionalities, or combinations thereof, in addition to or other than those set forth herein. It should be understood that any aspect of the disclosure may be embodied by one or more elements of a claim. The term "exemplary" is used herein to mean "serving as an example, instance, or illustration," and does not indicate preference or superiority.

In general, the disclosed systems may be implemented across various technical environments and industry domains. Devices requiring authentication may include laptop computers, tablet computers, smartphones, or applications running on such devices. Roaming authenticator devices may include smartphones, audio/video or multimedia endpoints, monitors or televisions with networking and acoustic capabilities, embedded system hardware devices connected to displays, or standalone embedded hardware devices. The acoustic communications occur within an acoustic volume-a physical space designed to confine acoustic signals-thereby ensuring authentication occurs within a specific area and enhancing security by preventing signal propagation beyond intended boundaries. By leveraging existing hardware, such as speakers and microphones, and employing acoustic spread-spectrum techniques, the system provides a secure, seamless, and user-friendly method for out-of-band authentication in multi-factor authentication frameworks. In the following detailed description, numerous specific details are set forth by way of examples to provide a thorough understanding of the relevant teachings. However, it should be apparent that the present teachings may be practiced without such details. In other instances, well-known structures, functions, methods, procedures, components, and/or circuitry have been described at a relatively high level, without detail, to avoid unnecessarily obscuring aspects of the present teachings.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

The illustrative embodiments are described with respect to certain types of machines. The illustrative embodiments are also described with respect to other scenes, subjects, measurements, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

To address the challenges associated with traditional methods of two-factor authentication, techniques are described that implement systems and methods for an acoustic communication system as an out-of-band factor in a multi-factor authentication framework.

The illustrative embodiments are described with respect to certain types of machines. The illustrative embodiments are also described with respect to other scenes, subjects, measurements, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various processes described herein may be implemented by appropriately programmed general purpose computers, special purpose computers, and computing devices. Typically, a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, one or more scripts, or in other forms. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogeneous media that may be read and/or written by a computer, a processor or a like device. The media may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes. Alternative database structures to those described may be readily employed. Databases may be stored locally or remotely from a device which accesses data in such a database.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on an Intel® or AMD® processor, that are adapted to communicate with the computer. Any number and type of devices may be in communication with the computer.

A server computer or centralized authority may or may not be necessary or desirable. In various cases, the network may or may not include a central authority device. Various processing functions may be performed on a central authority server, one of several distributed servers, or other distributed devices.

Figure 2:
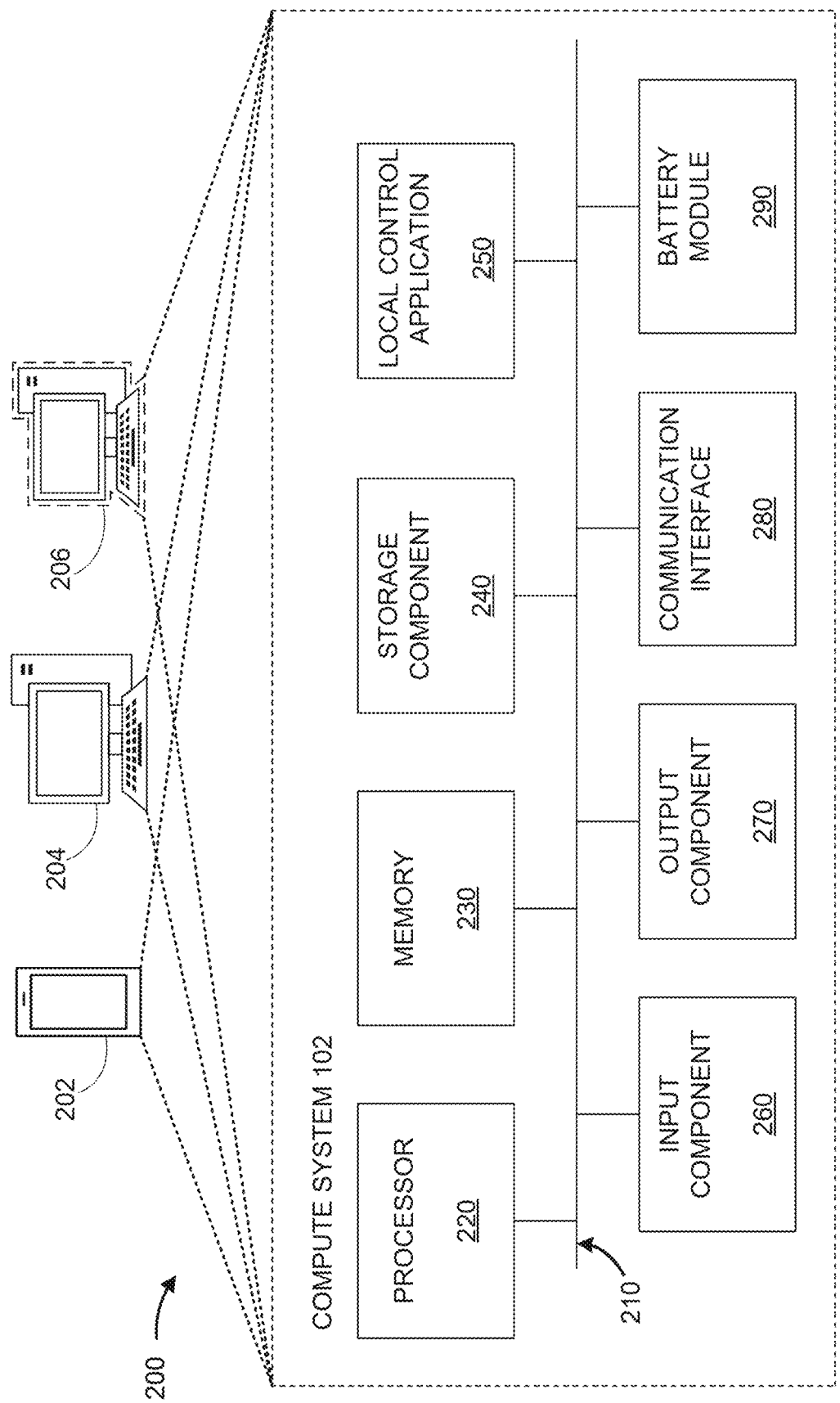
FIG. 2 depicts a block diagram of a data processing system in which illustrative embodiments may be implemented.

With reference to the figures and in particular, with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 is a diagram of an example environment 100 in which systems and/or methods described herein may be implemented. As shown in FIG. 1, the environment 100 may execute within a cloud computing system 102. The cloud computing system 102 may include one or more elements 103-113, as described in more detail below. As further shown in FIG. 1, the environment 100 may include a network 120, a network devices 130, and/or a base station 140. Devices and/or elements of the environment 100 may interconnect via wired connections and/or wireless connections. It is important to note that network devices 130, as described herein, is a user device which may be used by the first user and/or the second user. In the later case, when it is used by the second user, user device 130 may also be called a second user device 130. For purposes of convenience in reading this description, the embodiment of the user device 130 as a first user device will be described, but it should be understood as interchangeably termed "second user device" at least for the purposes of the disclosures of FIG. 1 and FIG. 2.

The cloud computing system 102 includes computing hardware 103, a resource management component 104, a host operating system (OS) 105, and/or one or more virtual computing systems 106. The resource management component 104 may perform virtualization (e.g., abstraction) of the computing hardware 103 to create the one or more virtual computing systems 106. Using virtualization, the resource management component 104 enables a single computing device (e.g., a computer, a server, and/or the like) to operate like multiple computing devices, such as by creating multiple isolated virtual computing systems 106 from the computing hardware 103 of the single computing device. In this way, the computing hardware 103 can operate more efficiently, with lower power consumption, higher reliability, higher availability, higher utilization, greater flexibility, and lower cost than using separate computing devices.

The computing hardware 103 includes hardware and corresponding resources from one or more computing devices. For example, the computing hardware 103 may include hardware from a single computing device (e.g., a single server) or from multiple computing devices (e.g., multiple servers), such as multiple computing devices in one or more data centers. As shown, the computing hardware 103 may include one or more processors 107, one or more memories 108, one or more storage components 109, and/or one or more networking components 110. Examples of a processor, a memory, a storage component, and a networking component (e.g., a communication component) are described elsewhere herein.

The resource management component 104 includes a virtualization application (e.g., executing on hardware, such as the computing hardware 103) capable of virtualizing the computing hardware 103 to start, stop, and/or manage the one or more virtual computing systems 106. For example, the resource management component 104 may include a hypervisor (e.g., a bare-metal or Type 1 hypervisor, a hosted or Type 2 hypervisor, and/or the like) or a virtual machine monitor, such as when the virtual computing systems 106 are virtual machines 111. Additionally, or alternatively, the resource management component 104 may include a container manager, such as when the virtual computing systems 106 are containers 112. In some implementations, the resource management component 104 executes within and/or in coordination with a host operating system 105.

A virtual computing system 106 includes a virtual environment that enables cloud-based execution of operations and/or processes described herein using computing hardware 103. As shown, the virtual computing system 106 may include a virtual machine 111, a container 112, a hybrid environment 113 that includes a virtual machine and a container, an environment which includes Docker-like filesystems or other possible Dockerization 114 with a VM or other computing hardware allocation, and/or the like. A virtual computing system 106 may execute one or more applications using a file system that includes binary files, software libraries, and/or other resources required to execute applications on a guest operating system (e.g., within the virtual computing system 106) or the host operating system 105.

The network 120 includes one or more wired and/or wireless networks. For example, the network 120 may include a cellular network, a public land mobile network (PLMN), a local area network (LAN), a wide area network (WAN), a satellite network, a private network, the Internet, and/or the like, and/or a combination of these or other types of networks. The network 120 enables communication among the devices of the environment 100.

Network devices 130 may be possessed by a first user and includes one or more devices capable of receiving, generating, storing, processing, and/or providing information, as described elsewhere herein. Network devices 130 may include a communication device and/or a computing device. For example, network devices 130 may include a wireless communication device, a mobile phone, a user equipment (UE), a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The base station 140 may support, for example, a cellular radio access technology (RAT). The base station may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the base station 140. The network devices 130 may transfer traffic between the base station 140 (e.g., using a cellular RAT), one or more base stations (e.g., using a wireless interface or a backhaul interface, such as a wired backhaul interface), and/or a core network. The network devices 130 may provide one or more cells that cover geographic areas.

The user device 150 may be possessed by a second user and includes one or more devices capable of receiving, generating, storing, processing, and/or providing information, as described elsewhere herein. User device 150 may include a communication device and/or a computing device, and may be connected to, or embedded anywhere within, a vehicle or other equipment known to be utilized in the transportation industry. For example, user device 150 may include a wireless communication device, a mobile phone, a vehicle computer system, a mobile printer, a calculator, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

FIG. 2 is a diagram of components of network devices 130, according to an example of the present disclosure. Network devices 130 may include a bus 210, a processor 220, a memory 230, a storage component 240, an input component 250, an output component 260, a communication interface 270, and battery module 290.

Bus 210 includes a component that permits communication among the components of Network devices 130. Processor 220 is implemented in hardware, firmware, or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 220 includes one or more processors capable of being programmed to perform a function. Memory 230 may include one or more memories such as a random access memory (RAM), a read only memory (ROM), and/or another type of dynamic or static storage device (e.g., a flash memory, a magnetic memory, and/or an optical memory) that stores information and/or instructions for use by processor 220. In some embodiments, a non-transitory computer-readable medium stores instructions that, when executed by a processor, cause the processor to perform various functions.

Storage component 240 stores information and/or software related to the operation and use of Network devices 130. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 250 includes a component that permits network devices 130 to receive information, such as via user input (e.g., a touch screen display, a keyboard, a keypad, a mouse, a button, a switch, and/or a microphone). Additionally, or alternatively, input component 250 may include a sensor for sensing information (e.g., a GPS component, an accelerometer, a gyroscope, and/or an actuator). Output component 260 includes a component that provides output information from network devices 130 (e.g., a display, a speaker, a user interface, and/or one or more light-emitting diodes (LEDs)). Output component 260 may include a display providing a GUI, such as an interface. Input component 250 and output component 260 may be combined into a single component, such as a touch responsive display, also known as a touchscreen.

Communication interface 270 includes a transceiver-like component (e.g., a transceiver and/or a separate receiver and transmitter) that enables network devices 130 to communicate with other devices, such as via a wired connection, a wireless connection, or a combination of wired and wireless connections. Communication interface 270 may permit network devices 130 to receive information from another device and/or provide information to another device. Communication interface 270 may include one or more RFFEs (radio frequency front ends) with antennae circuitry and RF (radio frequency) filters which may be variable power and/or purpose adapted for various communication frequencies, standards, links, and distances. For example, communication interface 270 may include an Ethernet interface, an optical interface, a coaxial interface, an infrared interface, an RF interface, a universal serial bus (USB) interface, a Wi-Fi interface, a cellular network interface, or the like.

Battery module 290 is connected along bus 210 to supply power to processor 220, memory 230, and internal components of network devices 130. Battery module 290 may supply power during field measurements by network devices 130. Battery module 290 permits Network devices 130 to be a portable integrated device for conducting field measurements of propagation delay in a RAN.

Network devices 130 may perform one or more processes described herein. Network devices 130 may perform these processes by processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may instruct processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, network devices 130 may include additional components, fewer components, different components, or differently arranged components than those shown in FIG. 2, 200. Additionally, or alternatively, a set of components (e.g., one or more components) of network devices 130 may perform one or more functions described as being performed by another set of components of network devices 130.

FIG. 2 is a diagram of components of network devices 130, according to an example of the present disclosure. Network devices 130 may include a bus 210, a processor 220, a memory 230, a storage component 240, an input component 250, an output component 260, a communication interface 270, and battery module 290.

Bus 210 includes a component that permits communication among the components of Network devices 130. Processor 220 is implemented in hardware, firmware, or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 220 includes one or more processors capable of being programmed to perform a function. According to an example, processor 220 is processor 220 of FIG. 6. Memory 230 may include one or more memories such as a random-access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of Network devices 130. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 250 includes a component that permits network devices 130 to receive information, such as via user input (e.g., a touch screen display, a keyboard, a keypad, a mouse, a button, a switch, and/or a microphone). Additionally, or alternatively, input component 250 may include a sensor for sensing information (e.g., a GPS component, an accelerometer, a gyroscope, and/or an actuator). Output component 260 includes a component that provides output information from network devices 130 (e.g., a display, a speaker, a user interface, and/or one or more light-emitting diodes (LEDs)). Output component 260 may include a display providing a GUI, such as an interface. Input component 250 and output component 260 may be combined into a single component, such as a touch responsive display, also known as a touchscreen.

Communication interface 270 includes a transceiver-like component (e.g., a transceiver and/or a separate receiver and transmitter) that enables network devices 130 to communicate with other devices, such as via a wired connection, a wireless connection, or a combination of wired and wireless connections. Communication interface 270 may include one or more short range communication interface modules and medium/long range communication interface modules, and may permit network devices 130 to receive information from another device and/or provide information to another device. For example, communication interface 270 may include an Ethernet interface, an optical interface, a coaxial interface, an infrared interface, an RF interface, a universal serial bus (USB) interface, a Wi-Fi interface, a cellular network interface, or the like.

Battery module 290 is connected along bus 210 to supply power to processor 220, memory 230, and internal components of network devices 130. Battery module 290 permits Network devices 130 to be a portable integrated device for conducting field measurements of propagation delay in a RAN.

Network devices 130 may perform one or more processes described herein. Network devices 130 may perform these processes by processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may instruct processor 220 to perform one or more processes described herein. Additionally, or alternatively, hardwired circuitry may be used in place of or in combination with software instructions to perform one or more processes described herein. Example embodiments user device 150 may include a mobile device/user equipment (UE) 202, a personal computer 204, or a virtual computing system 206 which may include various implementations such as those of 106. Thus, implementations described herein are not limited to any specific combination of hardware circuitry and software.

The number and arrangement of components shown in FIG. 2 are provided as an example. In practice, network devices 130 may include additional components, fewer components, different components, or differently arranged components than those shown in FIG. 2. Additionally, or alternatively, a set of components (e.g., one or more components) of network devices 130 may perform one or more functions described as being performed by another set of components of network devices 130.

Acoustic Communication System as an Out-of-Band Factor

Figure 3:
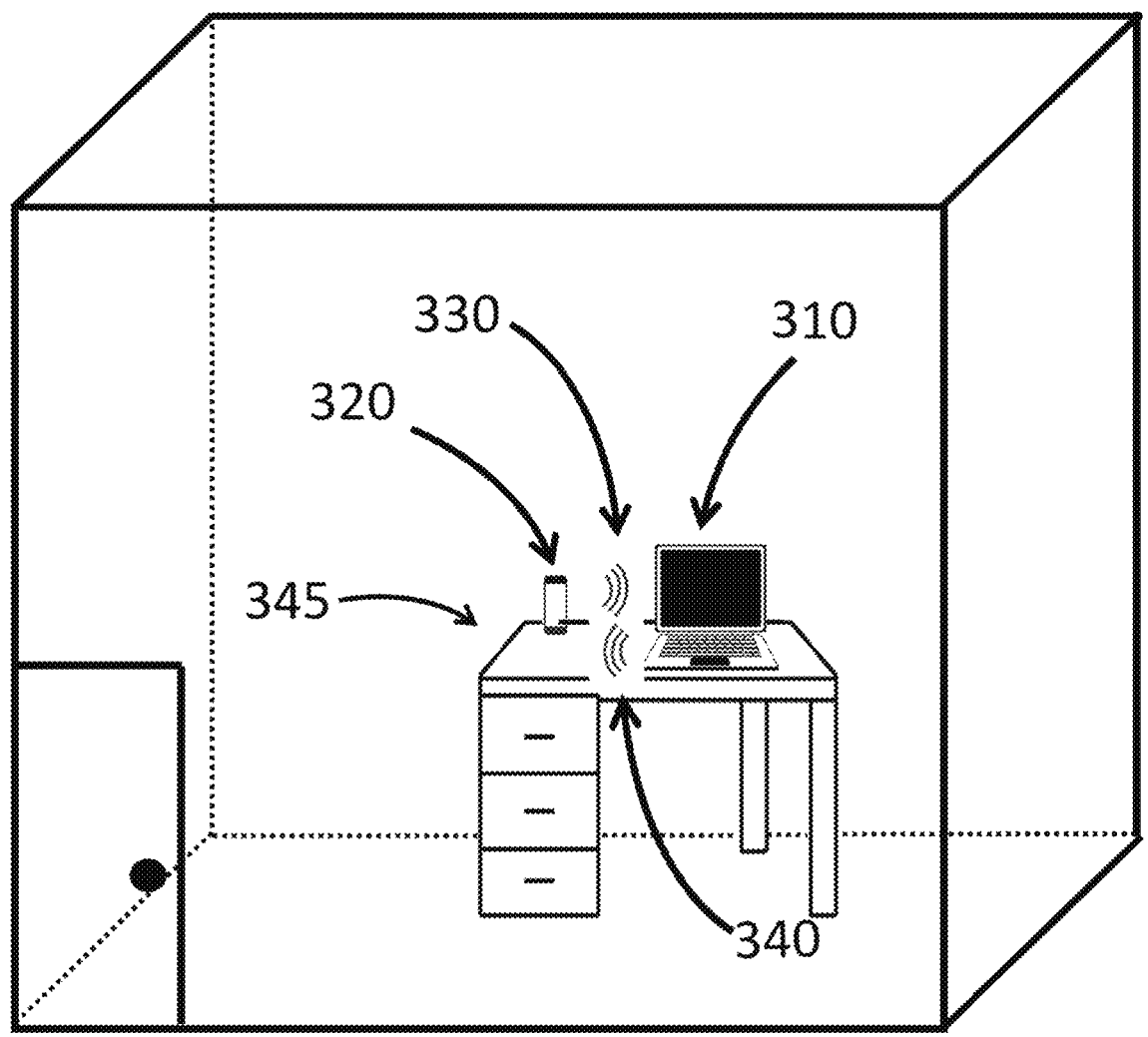
FIG. 3 depicts an out-of-band acoustic transmission between authenticator hardware device having networking and acoustic transmission capabilities and a user's computer within an acoustic volume, as shown in some embodiments.

In FIG. 3, an acoustic volume 300 is shown as a three-dimensional built environment where out-of-band authentication communications are performed. This acoustic volume is a defined physical space that confines acoustic signals, ensuring that authentication occurs within a specific area, thereby enhancing security by preventing signal propagation beyond the intended boundaries.

A first device, a laptop 310, is positioned on a table 345 within the acoustic volume 300. This device requires authentication and is equipped with necessary hardware, including at least one processor, a speaker, and a microphone, to facilitate acoustic communications. The laptop 310 may be constructed from materials that provide optimal acoustic properties, such as a housing made of aluminum or high-grade plastics to minimize unwanted sound absorption or reflection. It includes an advanced audio subsystem with high-fidelity speakers and sensitive microphones capable of transmitting and receiving signals in the low ultrasound frequency range, typically between 18 kHz and 22 kHz. The at least one processor within the laptop 310 executes specialized software algorithms for encoding and decoding acoustic signals using the cross-platform acoustic transport protocol. This software may be developed using programming languages such as C++ or Python and may utilize digital signal processing (DSP) libraries to handle real-time audio data.

The laptop 310 utilizes a cross-platform acoustic transport protocol to convey out-of-band authentication information over an acoustic channel.

Adjacent to the laptop 310 on the same table 345 is a second device, a portable authenticator 320. This roaming authenticator device is also equipped with a processor, speaker, and microphone, enabling it to participate in the acoustic communication process. The portable authenticator 320 may be implemented as a smartphone running an authentication application designed to interface with the laptop 310. This application leverages the smartphone's built-in speaker and microphone hardware to perform acoustic communications. The processor within the portable authenticator 320 may execute code that generates authentication responses based on cryptographic algorithms like Advanced Encryption Standard (AES) or Elliptic Curve Cryptography (ECC). The device may also include secure elements or Trusted Execution Environments (TEEs) to protect sensitive cryptographic keys and computational processes from tampering.

The portable authenticator 320 is configured to use the same cross-platform acoustic transport protocol as the laptop 310, ensuring compatibility and seamless communication.

Acoustic waveforms 330 represent acoustic signals emanating from the portable authenticator 320 toward the laptop 310. These signals initiate a two-factor authentication protocol, utilizing an acoustic bandwidth from approximately a few hundred hertz to low ultrasound frequencies. This range ensures that the out-of-band authentication is not audible to humans with normal hearing, maintaining an unobtrusive user experience. What is audible to humans with normal hearing is generally defined as 10 Hz-20 kHz. As people age, 17 kHz is a commonly-cited upper limit to the audible frequency range, for adults for example. Ultrasound is sound traveling at inaudible frequencies. Inaudible frequencies are generally defined as frequencies above 17 kHz, or more particularly, above 20 KHz.

Additional acoustic waveform 340 illustrates the returning acoustic data transmitted from the laptop 310 to the portable authenticator 320, illustrating that the authentication may go in either or both directions. This exchange employs acoustic spread-spectrum technology, specifically acoustic discrete-sequence spread-spectrum technology, to transmit authentication data. The use of spread-spectrum technology enhances security by making the signals resistant to interference and eavesdropping.

The table 345 provides a stable surface that in some aspects may ensure the microphones and speakers of both the laptop 310 and the portable authenticator 320 have a relatively direct and high fidelity acoustic path, although aspects of the present invention enable high performance in more wieldy and less acoustically transmissive acoustic volumes. The acoustic signals, represented by acoustic waveforms 330 and 340, symbolize discrete-sequence spread-spectrum transmissions that remain inaudible to individuals with nominal hearing. These signals are modulated using techniques such as Binary Phase Shift Keying (BPSK) or Quadrature Phase Shift Keying (QPSK), or Quadrature Amplitude Modulation (QAM) to encode digital information onto the ultrasonic carrier frequencies. The use of discrete-sequence spread-spectrum allows for low Probability of Intercept (LPI) and resistance to jamming. The system may employ error detection and correction codes, such as Hamming codes or Reed-Solomon codes, to enhance data integrity over the acoustic channel. Additionally, the devices may perform channel estimation and adaptive equalization to compensate for multipath propagation and Doppler shifts within the acoustic volume 300. These signals may carry acoustic encryption keys or time-based one-time passwords, securely authenticating user identity within the acoustic volume 300.

In some embodiments, the system utilizes a Diffie-Hellman key exchange protocol adapted for acoustic communication to establish a shared secret between the devices. The time-based one-time passwords (TOTPs) are generated using algorithms compliant with the RFC 6238 standard, ensuring synchronization between the devices based on the current timestamp and a shared secret key. The acoustic transmission of these TOTPs adds an additional layer of security, as the physical proximity required for acoustic communication reduces the risk of remote interception.

In one embodiment, the synchronization codes or information-bearing symbols used in the acoustic discrete-sequence spread-spectrum technology are changeable and programmable on subsequent authentications. This feature allows for dynamic security enhancements, ensuring that each authentication session is unique and resistant to replay attacks.

The devices may implement a frequency-hopping spread-spectrum (FHSS) scheme where the carrier frequency changes in a pseudo-random sequence known only to the communicating parties. This method further enhances security by making it difficult for an adversary to predict the frequencies used at any given time. The sequence can be updated periodically or after each authentication session using a pseudo-random number generator (PRNG) seeded with shared cryptographic material.

For instance, in the example illustrated in FIG. 3, the method may include a feedback training loop where the laptop 310 and portable authenticator 320 adapt their signal processing algorithms based on environmental feedback. Feedback training loops may be employed wherein the devices collect performance metrics such as latency, packet loss, and error rates during authentication sessions. Strategies to support technologies behind the software aspects include implementing adaptive algorithms that adjust transmission power, frequency, or modulation schemes in real time based on the collected metrics. Software frameworks like TensorFlow or PyTorch may be used to develop and deploy these adaptive algorithms efficiently. In addition, open standards and protocols can be adopted to ensure interoperability between devices from different manufacturers, fostering a broader ecosystem and enabling third-party developers to create compatible applications or enhancements.

This data is used to retrain machine learning models that predict optimal communication parameters under varying conditions. The models may be implemented using neural networks or other AI techniques and can adapt to changes in the environment, such as new sources of interference or alterations in room acoustics.

A process may involve machine learning techniques where the devices collect data on successful and failed authentication attempts, using this information to improve signal modulation, error correction, and noise filtering strategies. In addition, the system may utilize big data analytics to aggregate anonymized authentication data across multiple devices and locations. This analysis helps in detecting patterns indicative of security threats, such as coordinated attacks or anomalous behavior. The insights gained can inform updates to authentication protocols, threat models, and security policies. This continuous learning approach enhances system reliability over time, even in varying acoustic conditions.

Note that MFA can be present at either the device level or the application level or both. An example of the former is for the entire device to obtain access to a local network or to specific applications in a private network (e.g., many virtual private network use cases). An example of the latter is to gain access to a database intended only to be accessed by specific individuals. Many corporate use cases involve both types and in some instances one or both are integrated into corporate authentication architecture whereby the authentication is used for both purposes for a specific user (e.g., many ZTF environments).

The acoustic channel proposed herein is a non-standardized channel in that the exact form of the acoustic communication system is not yet specified in any traditional standards body (i.e., traditional standards development organizations). Although many techniques exist for digital communications over an acoustic channel, a preferred embodiment uses spread spectrum technology whereby the data-containing over-the-air symbols may use a synchronization technique and/or symbol mapping (to message bits) unknown to any potential MITM interloper. In addition, even if the synchronization technique and/or symbols are known, the codes used for the synchronization and/or the symbol mapping may be defined "on the fly" for each new authentication over the acoustic channel and thus not decodable by an MITM interloper. This is in contrast to Bluetooth, Near-field Communications (NFC) and other standardized radio-frequency or infrared air-gap communications techniques where individual fields of a message are decodable to a MITM interloper within the technology's range (however many of these decodable fields contain encrypted data that the MITM attacker may not be able exploit).

Overall, the figure illustrates a robust system for performing out-of-band authentication in a multi-factor authentication framework, leveraging acoustic communication technology to provide secure, seamless, and user-friendly authentication experiences.

Figure 4:
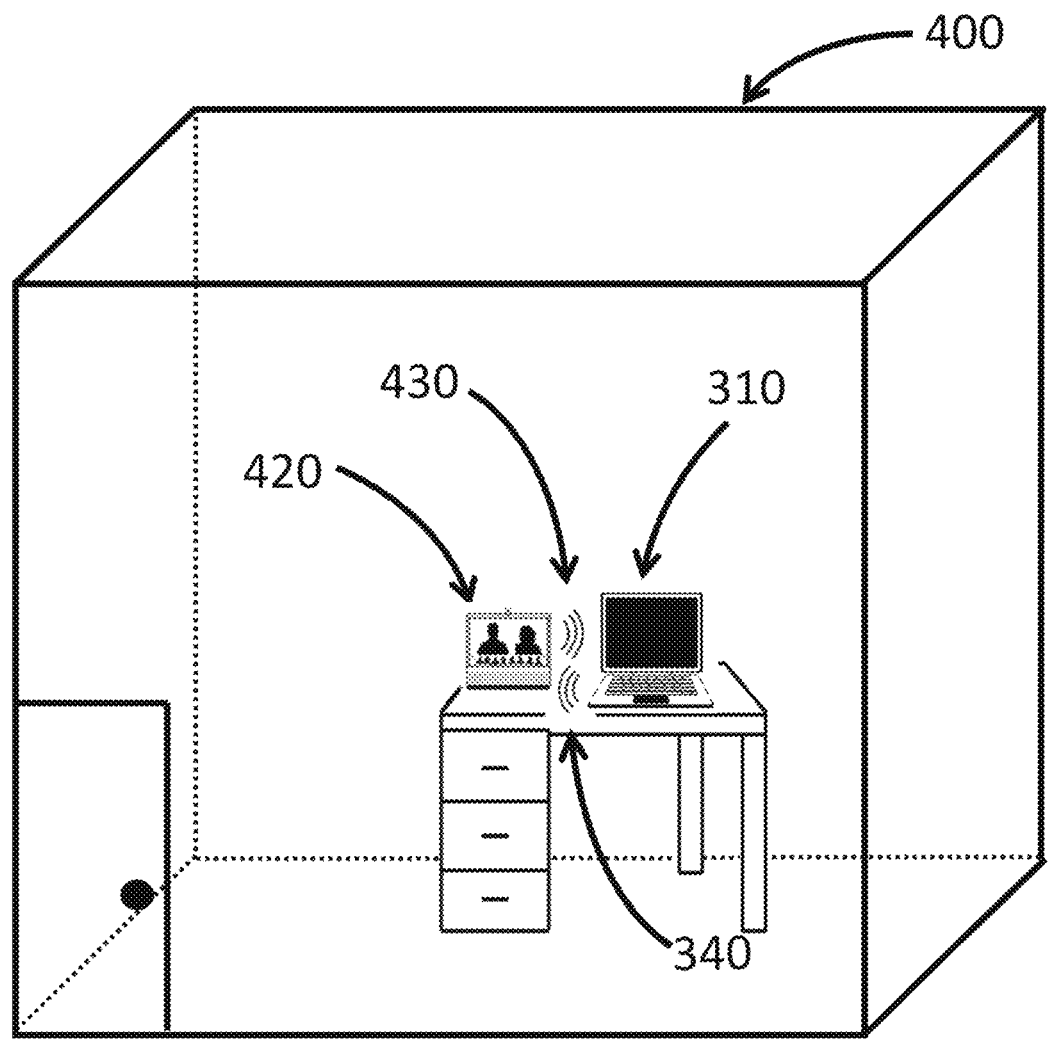
FIG. 4 depicts an out-of-band acoustic transmission between an embedded system hardware device connected to a monitor or television endpoint and a user's computer within an acoustic volume, as shown in some embodiments.

In FIG. 4, an acoustic volume 400 is depicted as a defined physical space where out-of-band authentication communications occur. This acoustic volume confines acoustic signals, ensuring that authentication is securely conducted within a specific area, thereby preventing signal propagation beyond the intended boundaries.

The acoustic volume 400 may be an office room with specific acoustic properties, such as dimensions that influence sound reflections and standing wave patterns. Materials used in walls, flooring, and furnishings within the acoustic volume 400 can affect acoustic absorption and diffusion, which are considered in the design of the system. Acoustic panels or diffusers may be installed to optimize sound quality and minimize unwanted echoes or reverberations that could unnecessarily interfere.

A first device, a laptop 310, is positioned on a desk within the acoustic volume 400. This device requires authentication and is equipped with essential hardware, including at least one processor, a speaker, and a microphone, to facilitate acoustic communications. The laptop 310 employs a cross-platform acoustic transport protocol to convey out-of-band authentication information over an acoustic channel.

To assemble the system effectively, the devices may incorporate modular hardware components that facilitate easy integration and scalability. For example, the laptop 310 and the roaming authenticator device, such as the multimedia endpoint 420, may include detachable acoustic transducer modules that can be upgraded or replaced to support different frequency ranges or improved performance. The acoustic transducers may be manufactured using piezoelectric materials like lead zirconate titanate (PZT) or polyvinylidene fluoride (PVDF), which offer high sensitivity and efficiency in the desired frequency ranges.

Adjacent to the laptop 310 on the same desk is a second device, a multimedia endpoint 420. The multimedia endpoint 420 may be a smart speaker or hub device with advanced audio capabilities, including high-quality speakers and an array of microphones. The loudness and fidelity of the audio is typically only at acceptable levels inside the acoustic volume being used by the system and method. It is connected to a network via Ethernet or Wi-Fi and can communicate with remote servers for additional authentication services. The processor within the multimedia endpoint 420 executes firmware that supports the cross-platform acoustic transport protocol and may include application-specific integrated circuits (ASICs) or digital signal processors (DSPs) optimized for real-time audio processing.

In some aspects, this roaming authenticator device is also equipped with a processor, speaker, and microphone, enabling it to participate in the acoustic communication process. The multimedia endpoint 420 is configured to deliver video and use vision inference models based on an embedded camera in some embodiments, and preferably uses the same cross-platform acoustic transport protocol as the laptop 310, ensuring compatibility and seamless communication.

Arrows 430 represent acoustic signals emanating from the multimedia endpoint 420 toward the laptop 310.

These signals initiate a two-factor authentication protocol, utilizing an acoustic bandwidth from approximately a few hundred hertz to low ultrasound frequencies. This range ensures that the out-of-band authentication is not audible to humans with normal hearing, maintaining an unobtrusive user experience.

Additional acoustic waveforms 340 illustrates the acoustic data transmitted from the laptop 310 to the multimedia endpoint 420 illustrating that the authentication may go in either or both directions, although it is most often unidirectional from 310. The bidirectional communication may enable mutual authentication, where both devices verify each other's identities before granting access. This process may involve exchanging digital certificates compliant with standards like X.509, ensuring that both the laptop 310 and the multimedia endpoint 420 are trusted entities within the system.

This exchange employs acoustic spread-spectrum technology, specifically acoustic discrete-sequence spread-spectrum technology, to transmit authentication data. The use of spread-spectrum technology enhances security by making the signals resistant to interference and eavesdropping.

To support the spread-spectrum communication, the devices may utilize digital signal processors (DSPs) or field-programmable gate arrays (FPGAs) that are programmed to perform real-time signal modulation and demodulation. The use of FPGAs allows for reprogrammable logic circuits, offering flexibility to implement new algorithms or to optimize existing ones for performance and power consumption. Additionally, error correction techniques such as convolutional codes or Turbo codes may be incorporated to improve data integrity over the acoustic channel, especially in environments with high ambient noise or interference.

The desk provides a stable surface that ensures the microphones and speakers of both the laptop 310 and the multimedia endpoint 420 are placed for effective signal capture. The acoustic signals (430 and 340), symbolize discrete-sequence spread-spectrum transmissions that remain inaudible to individuals with nominal hearing. These signals may carry acoustic encryption keys or time-based one-time passwords, securely authenticating user identity within the acoustic volume 400.

As illustrated in FIG. 4, it shall be noted that the system may also be applied in smart home environments, allowing users to authenticate devices such as smart locks or home automation systems seamlessly. In some embodiments, the methods described enable secure communication between IoT devices within a confined space, enhancing security in residential or commercial settings.

Furthermore, the technology may be used across various domains, including industrial automation and critical infrastructure control systems, where electromagnetic interference is a concern. Methods by these systems provides technical benefits by ensuring reliable authentication without reliance on radio frequency communication, which can be unreliable or prohibited in certain environments.

Firstly, unlike conventional techniques that may require physical contact or visual line-of-sight, the acoustic method allows for flexible device placement and interaction. Secondly, in some embodiments, the system's ability to adapt to environmental conditions through feedback mechanisms enhances its robustness over traditional fixed-parameter systems.

The system may support interoperability with external authentication services, such as integration with enterprise identity management systems or cloud-based authentication providers. This capability allows the acoustic authentication process to complement existing security infrastructures, providing a seamless user experience while maintaining compliance with organizational security policies and regulatory requirements.

In one embodiment, the synchronization codes or information-bearing symbols used in the acoustic discrete-sequence spread-spectrum technology are changeable and programmable on subsequent authentications. This feature allows for dynamic security enhancements, ensuring that each authentication session is unique and resistant to replay attacks.

Overall, the figure illustrates a robust system for performing out-of-band authentication in a multi-factor authentication framework, leveraging acoustic communication technology to provide secure, seamless, and user-friendly authentication experiences.

Figure 5:
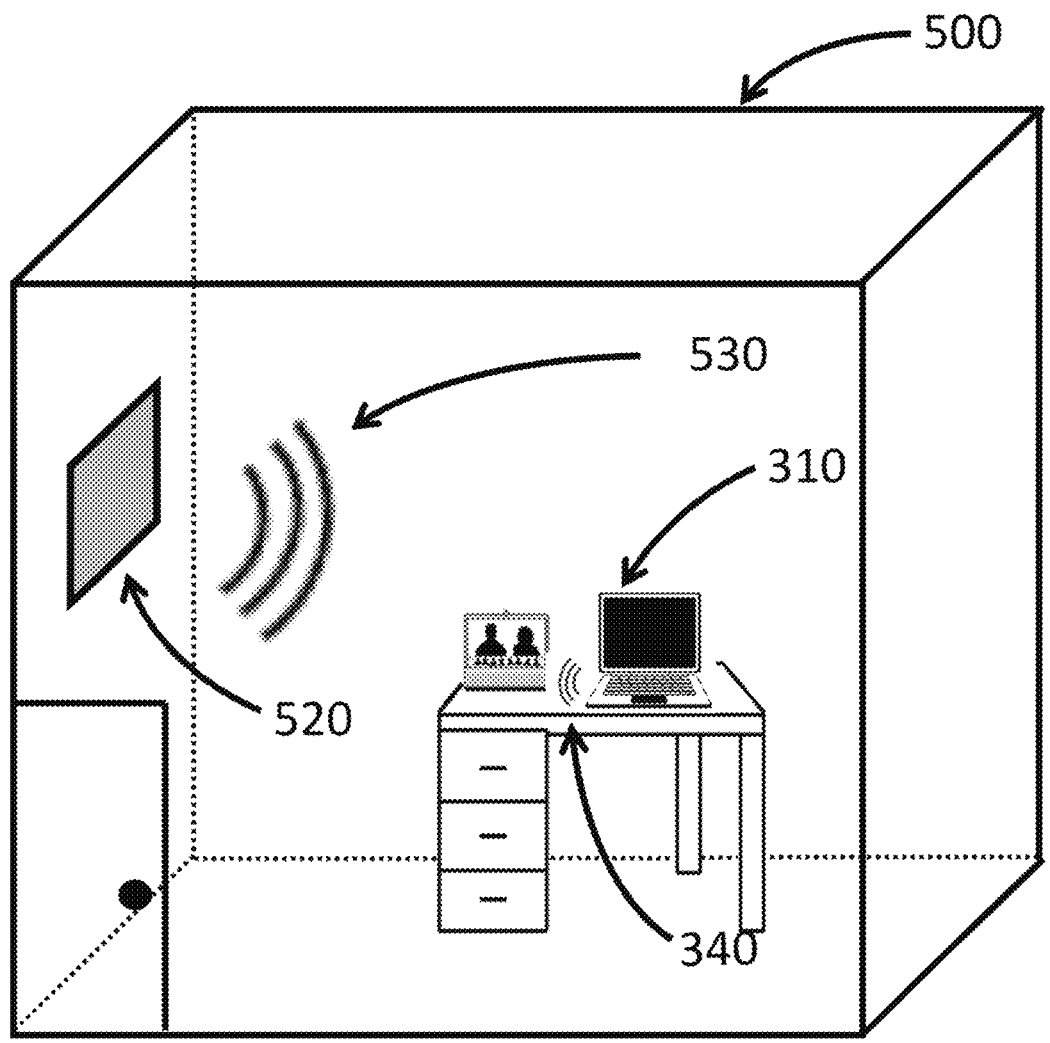
FIG. 5 depicts an out-of-band acoustic transmission between a stand-alone embedded system hardware device and a user's computer within an acoustic volume, as shown in some embodiments.

In FIG. 5, an acoustic volume 500 is depicted as a defined physical space where out-of-band authentication communications occur. This acoustic volume confines acoustic signals, ensuring that authentication is securely conducted within a specific area, thereby preventing signal propagation beyond the intended boundaries.

A first device, a laptop 310, is centrally positioned on a desk within the acoustic volume 500. This device requires authentication and is equipped with essential hardware, including at least one processor, a speaker, and a microphone, to facilitate acoustic communications. The laptop 310 employs a cross-platform acoustic transport protocol to convey out-of-band authentication information over an acoustic channel.

Adjacent to the laptop 310 on the same desk is a multimedia endpoint 420. This roaming authenticator device is also equipped with a processor, speaker, and microphone, enabling it to participate in the acoustic communication process. The multimedia endpoint 420 is configured to use the same cross-platform acoustic transport protocol as the laptop 310, ensuring compatibility and seamless communication.

In some embodiments, the devices operate using a software-defined acoustic communication system, where the signal processing algorithms are implemented in firmware or software, allowing for updates and reconfiguration without hardware changes. This approach enables support for various modulation schemes, encoding methods, and protocol adjustments to accommodate different use cases or to enhance security features. Software updates can be securely delivered over networks or through physical media, ensuring devices remain up-to-date with the latest standards and protections.

Wall-mounted device 520 emanates acoustic signals from a wall-mounted location toward the laptop 310. The wall-mounted device may be an embedded system hardware device connected to the building's infrastructure, such as a smart thermostat or intercom system equipped with acoustic communication capabilities. It includes processors, memory, and dedicated acoustic transducers designed for high-fidelity signal transmission. The device may utilize power-over-Ethernet (POE) for both power and network connectivity, allowing for centralized management and firmware updates.

These signals initiate a two-factor authentication protocol, utilizing an acoustic bandwidth from approximately a few hundred hertz to low ultrasound frequencies. This range ensures that the out-of-band authentication is not audible to humans with normal hearing, maintaining an unobtrusive user experience.

An additional acoustic waveform 340 illustrates the returning acoustic data transmitted from the laptop 310 to the multimedia endpoint 420, completing the bidirectional exchange necessary for authentication. This exchange employs acoustic spread-spectrum technology, specifically acoustic discrete-sequence spread-spectrum technology, to transmit authentication data. The use of spread-spectrum technology enhances security by making the signals resistant to interference and eavesdropping.

This sensor monitors environmental noise or boundary conditions that may affect acoustic propagation. By gathering room echo characteristics, an acoustic sensor may, in some embodiments inform processing modules in either the laptop 310 or the multimedia endpoint 420, to allow for real-time adjustments to spread-spectrum parameters and ensuring reliable communication.

The desk provides a stable surface that ensures the microphones and speakers of both the laptop 310 and the multimedia endpoint 420 are optimally aligned for effective signal capture. The acoustic signals, represented by arrows 530 and 340, symbolize discrete-sequence spread-spectrum transmissions that remain inaudible to individuals with nominal hearing. These signals may carry acoustic encryption keys or time-based one-time passwords, securely authenticating user identity within the acoustic volume 500. In some embodiments, the authentication process is augmented with biometric verification, such as voice recognition. The laptop 310 and wall-mounted device may analyze the user's voice characteristics during the acoustic exchange to confirm identity. This multimodal authentication approach strengthens security by combining something the user has (the device) with something the user is (biometric data).

It shall be noted that the methods and systems described may be employed in security-sensitive environments such as data centers, military facilities, or medical laboratories. In such settings, the use of acoustic authentication minimizes the risk of electromagnetic emissions that could be intercepted, thereby enhancing overall security.

Moreover, the system may be used across various technological domains, including aviation and maritime industries, where radio frequency communications are heavily regulated. By utilizing acoustic signals, the authentication process remains compliant with regulatory standards while providing secure access control.

Methods by these systems offer significant technical benefits over conventional techniques. Firstly, it reduces the dependency on network connectivity, allowing for authentication in offline or air-gapped systems. Secondly, the physical confinement of acoustic signals within the acoustic volume ensures that authentication cannot be easily intercepted or spoofed from remote locations.

In one embodiment, the synchronization codes or information-bearing symbols used in the acoustic discrete-sequence spread-spectrum technology are changeable and programmable on subsequent authentications. This feature allows for dynamic security enhancements, ensuring that each authentication session is unique and resistant to replay attacks.

Overall, the figure illustrates a robust system for performing out-of-band authentication in a multi-factor authentication framework, leveraging acoustic communication technology to provide secure, seamless, and user-friendly authentication experiences.

Figure 6:
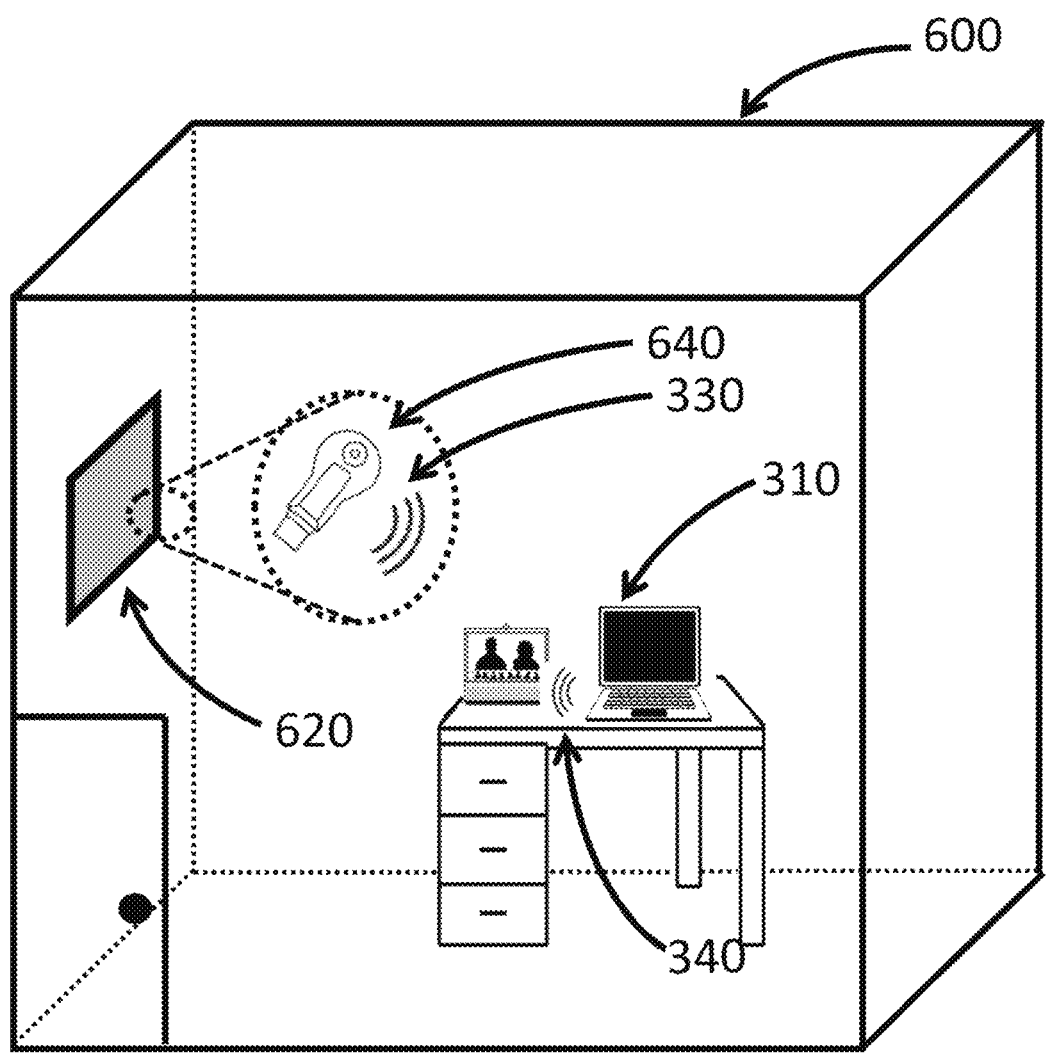
FIG. 6 depicts an out-of-band authentication exchange involving a hardware token and multiple devices within an acoustic volume, as shown in some embodiments.

In FIG. 6, an acoustic volume 600 is depicted as a defined physical space where out-of-band authentication communications occur. This acoustic volume confines acoustic signals, ensuring that authentication is securely conducted within a specific area, thereby preventing signal propagation beyond the intended boundaries.

A first device, a laptop 310, is centrally positioned on a desk within the acoustic volume 600. This device requires authentication and is equipped with essential hardware, including at least one processor, a speaker, and a microphone, to facilitate acoustic communications. The laptop 310 employs a cross-platform acoustic transport protocol to convey out-of-band authentication information over an acoustic channel.

Adjacent to the laptop 310 on the same desk is a multimedia endpoint 420. This roaming authenticator device is also equipped with a processor, speaker, and microphone, enabling it to participate in the acoustic communication process. The multimedia endpoint 420 is configured to use the same cross-platform acoustic transport protocol as the laptop 310, ensuring compatibility and seamless communication.

Acoustic waveforms 530 represent acoustic signals emanating from a wall-mounted device toward the laptop 310. These signals initiate a two-factor authentication protocol, utilizing an acoustic bandwidth from approximately a few hundred hertz to low ultrasound frequencies. This range ensures that the out-of-band authentication is not audible to humans with normal hearing, maintaining an unobtrusive user experience.

An additional acoustic waveform 340 illustrates the returning acoustic data transmitted from the laptop 310 to the multimedia endpoint 420, completing the bidirectional exchange necessary for authentication. This exchange employs acoustic spread-spectrum technology, specifically acoustic discrete-sequence spread-spectrum technology, to transmit authentication data. The use of spread-spectrum technology enhances security by making the signals resistant to interference and eavesdropping.

A hardware device 640 is depicted within a dotted region, facilitating secure key storage and exchanging credentials over acoustic waveforms 330. The hardware device 640 may be a secure microcontroller or a hardware security module (HSM) that provides tamper-resistant storage of cryptographic keys. It connects to the laptop 310 via interfaces such as USB, Near Field Communication (NFC), or even acoustically. The hardware token 640 performs cryptographic operations, like signing authentication responses or decrypting challenges, without exposing sensitive keys to the host device's memory, thereby enhancing security against software-based attacks.

This token supports cryptographic operations, such as public key encryption, to enhance security. The hardware device 640 may be used to store synchronization codes or information-bearing symbols that are changeable and programmable on subsequent authentications, providing dynamic security enhancements.

The desk provides a stable surface that ensures the microphones and speakers of both the laptop 310 and the multimedia endpoint 420 are optimally aligned for effective signal capture. The acoustic signals, represented by acoustic waveforms 330, and 340, symbolize discrete-sequence spread-spectrum transmissions that remain inaudible to individuals with nominal hearing. These signals may carry acoustic encryption keys or time-based one-time passwords, securely authenticating user identity within the acoustic volume 600.

In some embodiments, as illustrated in FIG. 6, the system may be integrated into public transportation systems for secure access control and ticket validation. The methods described herein can enhance user convenience by enabling contactless and seamless authentication as passengers enter or exit vehicles or stations.

Furthermore, the technology may be utilized in event management, providing secure entry to venues through acoustic authentication embedded in turnstiles or entry gates. This application showcases the versatility of the system across different industry domains.

Methods by these systems result in technical benefits by improving the speed and reliability of authentication processes in high-throughput environments. Firstly, unlike conventional methods requiring barcode scans or RFID, the acoustic system reduces bottlenecks by allowing multiple authentications to occur simultaneously without physical scanning devices. Secondly, in some embodiments, the adaptability of the system to different environmental acoustics enhances its effectiveness over standard authentication mechanisms that may fail in crowded or noisy conditions.

The system may implement a hierarchical key management scheme where master keys are stored within the hardware token 640, and session keys are derived for individual authentication sessions. This approach limits the exposure of long-term keys and allows for key rotation policies to be enforced. The use of the hardware token 640 also enables compliance with security standards such as FIPS 140-2 or Common Criteria.

Overall, the figure illustrates a robust system for performing out-of-band authentication in a multi-factor authentication framework, leveraging acoustic communication technology to provide secure, seamless, and user-friendly authentication experiences.

Figure 7:
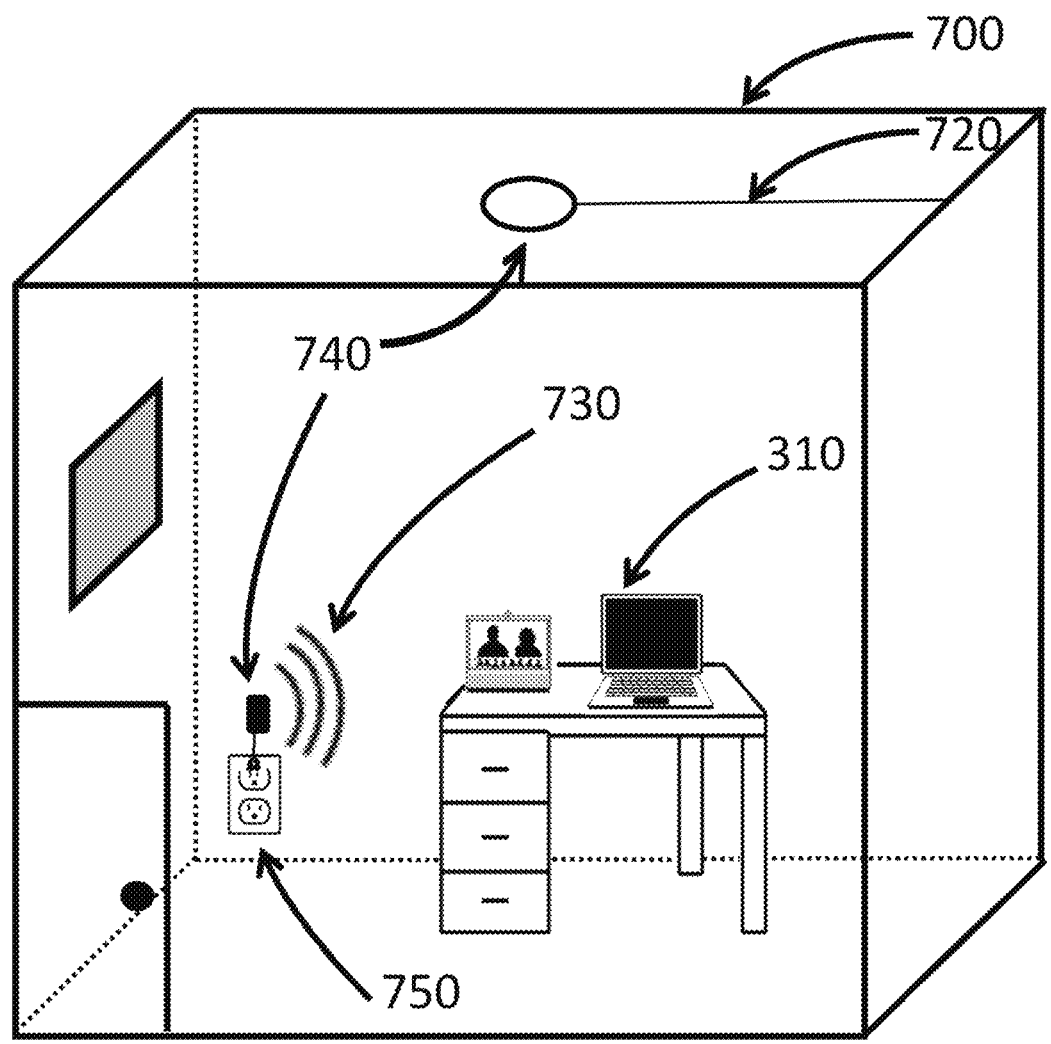
FIG. 7 depicts a multi-factor authentication system utilizing a ceiling-mounted transducer and an outlet-based acoustic node within an acoustic volume, as shown in some embodiments.

In FIG. 7, an acoustic volume 700 is depicted as a defined physical space where out-of-band authentication communications occur. This acoustic volume confines acoustic signals, ensuring that authentication is securely conducted within a specific area, thereby preventing signal propagation beyond the intended boundaries.

A first device, a laptop 310, is centrally positioned on a desk within the acoustic volume 700. This device requires authentication and is equipped with essential hardware, including at least one processor, a speaker, and a microphone, to facilitate acoustic communications. The laptop 310 employs a cross-platform acoustic transport protocol to convey out-of-band authentication information over an acoustic channel.

Adjacent to the laptop 310 on the same desk is a multimedia endpoint 420. This roaming authenticator device is also equipped with a processor, speaker, and microphone, enabling it to participate in the acoustic communication process. The multimedia endpoint 420 is configured to use the same cross-platform acoustic transport protocol as the laptop 310, ensuring compatibility and seamless communication.

A ceiling-mounted transducer 740 is positioned above the acoustic volume 700. The ceiling-mounted transducer 740 may be part of an array of transducers forming a distributed acoustic network within the space. This network enables advanced acoustic techniques, such as beamforming and spatial filtering, to direct acoustic signals precisely and minimize interference. The transducer 720 may operate under the control of a centralized processing unit that coordinates signal transmissions based on real-time environmental assessments.

This transducer is responsible for emitting or receiving acoustic signals, similar to 730, to facilitate multi-factor authentication. In manufacturing the ceiling-mounted transducer 740, materials such as aluminum or composite polymers may be utilized to create a lightweight yet durable housing. The transducer elements themselves could be fabricated using microelectromechanical systems (MEMS) technology, allowing for miniaturization and integration of multiple transducers into an array configuration. This array can perform beamforming, directing acoustic signals precisely toward targeted devices like the laptop 310 or multimedia endpoint 420, thus enhancing signal strength and reducing interference from reflections or obstructions within the acoustic volume 700. The signals utilize an acoustic bandwidth from approximately a few hundred hertz to low ultrasound frequencies, ensuring that the out-of-band authentication is not audible to humans with normal hearing.

An additional acoustic waveform 730 illustrates the returning acoustic data transmitted from the laptop 310 to the multimedia endpoint 420, completing the bidirectional exchange necessary for authentication. In this configuration, the system supports multiple authentication paths, offering redundancy and increased reliability. The laptop 310 can communicate with both the multimedia endpoint 420 and the ceiling-mounted transducer 740, allowing the authentication process to select the optimal communication channel based on current conditions. The system may use algorithms to assess signal quality metrics like Signal-to-Noise Ratio (SNR) or Bit Error Rate (BER) to make these determinations.

This exchange employs acoustic spread-spectrum technology, specifically acoustic discrete-sequence spread-spectrum technology, to transmit authentication data. The use of spread-spectrum technology enhances security by making the signals resistant to interference and eavesdropping.

A wall outlet or power source 750 hosts an outlet-based acoustic node, from which acoustic waveform 730 depicts further acoustic signals directed toward the desk for secure authentication. The outlet-based acoustic node may be designed with a plug-and-play architecture, allowing it to be easily installed into standard electrical outlets without requiring professional assistance. It can be equipped with power line communication (PLC) capabilities, enabling it to communicate with other devices over existing electrical wiring. This integration simplifies the installation process and reduces additional infrastructure costs. The acoustic node may also include sensors to monitor environmental conditions such as temperature, humidity, or ambient light, which can be used to further adapt the acoustic communication parameters for optimal performance.

Further, the outlet-based acoustic node may be a standalone embedded system hardware device that leverages existing power infrastructure for operation. It can serve as an additional authentication point or as a relay to extend the range of the acoustic communication network. The node may include power line communication capabilities to transmit data over the electrical wiring, enhancing connectivity without additional cabling.

This node may serve as an additional roaming authenticator or supporting node for multi-factor authentication, providing redundancy and enhancing the robustness of the system.

The desk provides a stable surface that ensures the microphones and speakers of both the laptop 310 and the multimedia endpoint 420 allow for effective signal capture. The acoustic signals, represented by 730, symbolize discrete-sequence spread-spectrum transmissions that remain inaudible to individuals with nominal hearing. These signals may carry acoustic encryption keys or time-based one-time passwords, securely authenticating user identity within the acoustic volume 700.

To broaden the range of embodiments, the system may also support hybrid communication modes that combine acoustic signals with other channels, such as optical (infrared) or electromagnetic (Bluetooth Low Energy), to convey authentication data. This multimodal approach adds redundancy and allows the system to adapt to varying environmental conditions or user preferences. For example, in noisy environments where acoustic communication may be less effective, the system can automatically switch to an alternative channel without compromising security or user experience.

It shall be noted that in some embodiments, the methods and systems described may be applied in collaborative workspaces or conference rooms to authenticate participants and secure sensitive communications. As illustrated in FIG. 7, the integration of ceiling-mounted transducers and outlet-based acoustic nodes facilitates a robust authentication network within shared environments.

Moreover, the system may be used across various technological domains such as education, where secure access to digital resources and examinations is critical. The acoustic authentication method ensures that only authorized individuals gain access, thereby upholding academic integrity.

Methods by these systems provide numerous technical benefits over conventional authentication techniques. Firstly, unlike traditional password-based systems that are vulnerable to phishing attacks, the described acoustic method offers a multi-factor authentication approach that is difficult to compromise remotely. Secondly, in some embodiments, the system's capability to utilize existing hardware components reduces implementation costs and simplifies integration into existing infrastructures.

FIG. 8 is a flowchart of an example method for performing out-of-band authentication in a multi-factor authentication framework.

At step 810, the method comprises using, by a device requiring authentication, a cross-platform acoustic transport protocol to convey out-of-band authentication information over an acoustic channel between the device requiring authentication and a roaming authenticator device, wherein acoustic communications over the acoustic channel utilize hardware present on the device requiring authentication and the roaming authenticator device]

At step 820, the method comprises utilizing, by the device requiring authentication and the roaming authenticator device, an acoustic bandwidth from approximately a few hundred hertz to low ultrasound frequencies for the acoustic communications.

At step 830, the method comprises employing, by the device requiring authentication and the roaming authenticator device, acoustic spread-spectrum technology to transmit authentication data over the acoustic channel.

Moreover, in some embodiments, as illustrated in FIGS. 3-8, the methods may include processes for identifying and classifying the devices participating in the authentication. Furthermore, machine learning algorithms may be employed to analyze patterns in the acoustic signals for device identification and anomaly detection. Techniques such as neural networks or support vector machines can be trained to recognize the unique acoustic signatures of authorized devices, enhancing security by preventing unauthorized devices from participating in the authentication process. Continuous learning models can update themselves based on new data, improving accuracy over time and adapting to changes in device hardware or environmental factors.

For instance, the devices may perform acoustic fingerprinting, analyzing the unique characteristics of received signals to verify the identity of the transmitting device. This technique considers factors such as speaker and microphone frequency responses, adding an extra layer of device-specific authentication.

The described technology not only enhances security but also improves accessibility. For users with disabilities, alternative modalities such as haptic feedback or visual indicators may be provided to confirm successful authentication. The system can be configured to comply with accessibility standards like the Americans with Disabilities Act (ADA) or Web Content Accessibility Guidelines (WCAG), ensuring inclusive usability.

It shall be noted that the methods described herein can be applied to various technological domains, providing a flexible and scalable solution for modern authentication challenges. By leveraging acoustic communication, the system facilitates secure, efficient, and user-friendly authentication processes that address the limitations of conventional techniques. The system may be extended to include applications in augmented reality (AR) and virtual reality (VR) environments. For instance, acoustic authentication can be utilized to securely initiate and maintain connections between AR/VR headsets and peripheral devices, enhancing the immersive experience while safeguarding user data. Additionally, the principles of the invention can be applied to underwater communications, where acoustic channels are commonly used, thereby broadening the scope of the embodiments to include marine technology and exploration equipment.

It shall be noted that the methods and systems described herein may be utilized across a variety of industry and technological domains, such as finance, healthcare, government, telecommunications, and secure facility access control. In some embodiments, the acoustic authentication framework enhances security protocols in corporate environments by providing an additional layer of authentication that is both non-intrusive and highly secure.

The foregoing methods, in some embodiments, may be used to produce high-quality authentication processes that are essential in situations requiring stringent security measures. Furthermore, in telecommunication systems, the described methods may facilitate secure logins to network equipment or services where traditional wireless communications are unreliable or prohibited.

In some aspects, the foregoing methods result in many technical benefits over conventional authentication techniques. Firstly, unlike conventional techniques that solely rely on electromagnetic signals, which can be intercepted or jammed, the acoustic communication method provides a secure alternative less susceptible to such interferences. Secondly, the utilization of low ultrasound frequencies ensures that the authentication process remains imperceptible to users, thereby not disrupting the user experience while maintaining high security standards.

Overall, the figures illustrate a robust system for performing out-of-band authentication in a multi-factor authentication framework, leveraging acoustic communication technology to provide secure, seamless, and user-friendly authentication experiences.

CONCLUSION

For clarity of explanation, the above description has focused on a representative sample of all possible embodiments, a sample that teaches the principles of the invention and conveys the best mode contemplated for carrying it out. The invention is not limited to the described embodiments. Well known features may not have been described in detail to avoid unnecessarily obscuring the principles relevant to the claimed invention. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed alternatives, variations, modifications, and equivalents are within the literal scope of the following claims, and others are equivalent. The claims may be practiced without some or all of the specific details described in the specification. In many cases, method steps described in this specification can be performed in different orders than that presented in this specification, or in parallel rather than sequentially, or in different computers of a computer network, rather than all on a single computer. It is to be understood that the present technology contemplates that, to the extent possible, one or more features of any implementation can be combined with one or more features of any other implementation.

While the above description details certain embodiments of the invention and describes the best mode contemplated, no matter how detailed the above appears in text, the invention can be practiced in many ways. Therefore, implementation details may vary considerably while still being encompassed by the invention disclosed herein. Particular terminology used when describing certain features or aspects of the invention should not be taken to imply that the terminology is being redefined herein to be restricted to any specific characteristics, features, or aspects of the invention with which that terminology is associated.

Any specific manifestations of these and other similar example processes are not intended to be limiting to the disclosure. Any suitable manifestation of these and other similar example processes can be selected within the scope of the illustrative embodiments.

Thus, a computer-implemented method, system or apparatus, and computer program product are provided in the illustrative embodiments for systems and methods for an acoustic communication system as an out-of-band factor in a multi-factor authentication framework and other related features, functions, or operations. Where an embodiment or a portion thereof is described with respect to a type of device, the computer-implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser, or other lightweight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present disclosure may be a system, a method, and/or a computer program product at any possible technical detail level of integration. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on a dedicated system or user's computer, partly on the user's computer or dedicated system as a stand-alone software package, partly on the user's computer and partly on a remote computer or entirely on the remote computer or server, etc. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

What is claimed is:

1. A method for performing out-of-band authentication in a multi-factor authentication framework, comprising:
    providing a device requiring authentication and reauthentication within a zero-trust framework session or work environment, a cross-platform acoustic transport protocol to convey out-of-band authentication information over an acoustic channel between the device requiring authentication and a roaming authenticator hardware device;
        wherein acoustic communications over the acoustic channel utilize hardware present on the device requiring authentication and the roaming authenticator hardware device;
    utilizing, by the device requiring authentication and the roaming authenticator device, part of an acoustic bandwidth from ten thousand hertz to low ultrasound frequencies for the acoustic communications; and
    employing, by the device requiring authentication and the roaming authenticator device, acoustic spread-spectrum technology to transmit authentication data over the acoustic channel from the authenticator hardware device to the device requiring authentication and reauthentication;
    wherein the authentication is performed continuously and imperceptibly to a user within a zero-trust framework.

2. The method of claim 1, wherein the acoustic communications have an authentication response that changes with each authentication.

3. The method of claim 1, wherein the acoustic bandwidth used for the acoustic communications is in a low ultrasound range such that the out-of-band authentication over the cross-platform acoustic transport protocol is not audible to humans with normal hearing.

4. The method of claim 1, wherein the acoustic spread-spectrum technology comprises acoustic discrete-sequence spread-spectrum technology.

5. The method of claim 4, wherein synchronization codes or user code symbols used in the acoustic discrete-sequence spread-spectrum technology are changeable and programmable on subsequent authentications to transmit the out-of-band data on the acoustic channel.

6. The method of claim 1, further comprising performing an initial authentication over the cross-platform acoustic transport protocol.

7. The method of claim 1, wherein an initial authentication occurs using an authentication mechanism other than the cross-platform acoustic transport protocol, and subsequent authentications use the cross-platform acoustic transport protocol.

8. The method of claim 1, wherein the device requiring authentication is selected from the group consisting of a laptop computer, a tablet computer, a smartphone, or an application running on such a device.

9. The method of claim 1, wherein the roaming authenticator device is selected from the group consisting of:
    a smartphone;
    an audio, video, or multimedia endpoint;
    a monitor or television endpoint having networking and acoustic transmission capabilities;
    an embedded system hardware device connected to a monitor or television endpoint; and
    a standalone embedded system hardware device.

10. The method of claim 1, wherein the acoustic communications occur within an acoustic volume, the acoustic volume being a physical space within which acoustic information transfer takes place between the device requiring authentication and the roaming authenticator device.

11. The method of claim 10, wherein the acoustic volume is configured such that acoustic signals do not propagate at sufficient loudness or fidelity to be received outside of the acoustic volume, thereby ensuring authentication occurs within a specific physical space.

12. A system for performing out-of-band authentication in a multi-factor authentication framework, comprising:
    a device requiring authentication, comprising:
        at least one processor;
        a speaker; and
        a microphone;
    a roaming authenticator device, comprising:
        at least one processor;
        a speaker; and
        a microphone;
    wherein the device requiring authentication and a roaming hardware authenticator device are configured to use a standardized or non-standardized cross-platform acoustic transport protocol to convey out-of-band authentication information over an acoustic channel between them;
    wherein acoustic communications over the acoustic channel utilize hardware present on the device requiring authentication and the roaming authenticator hardware device;
    wherein the device requiring authentication and a roaming authenticator device are configured to:
    utilize part of an acoustic bandwidth from ten thousand hertz to low ultrasound frequencies for the acoustic communications;
    employ acoustic spread-spectrum technology to transmit authentication data over the acoustic channel from the authenticator hardware device to the device requiring authentication and reauthentication; and wherein the authentication is performed continuously and imperceptibly to a user within a zero-trust framework.

13. The system of claim 12, wherein the acoustic communications have an authentication response that changes with each authentication.

14. The system of claim 12, wherein the acoustic bandwidth used for the acoustic communications is in a low ultrasound range such that the out-of-band authentication over the cross-platform acoustic transport protocol is not audible to humans with normal hearing.

15. The system of claim 12, wherein:

the device requiring authentication is selected from the group consisting of a laptop computer, a tablet computer, a smartphone, or an application running on such a device;

the roaming authenticator device is selected from the group consisting of:

a smartphone;

an audio, video, or multimedia endpoint;

a monitor or television endpoint having networking and acoustic transmission capabilities;

an embedded system hardware device connected to a monitor or television endpoint; and a standalone embedded system hardware device.

16. A computer program product comprising a non-transitory computer-readable storage medium storing instructions that, when executed by one or more processors of a device requiring authentication and a roaming authenticator device, cause the processors to perform operations comprising:

facilitating, by a device requiring authentication and reauthentication within a zero-trust framework session or work environment and a roaming authenticator hardware device, out-of-band authentication in a multi-factor authentication framework by conveying out-of-band authentication information over an acoustic channel between the device requiring authentication and the roaming authenticator hardware device using a standardized or non-standardized cross-platform acoustic transport protocol;

utilizing hardware present on the device requiring authentication and the roaming authenticator hardware device for acoustic communications over the acoustic channel;

utilizing part of an acoustic bandwidth from ten thousand hertz to low ultrasound frequencies for the acoustic communications; and employing acoustic spread-spectrum technology to transmit authentication data over the acoustic channel from the authenticator hardware device to the device requiring authentication and reauthentication;

wherein the authentication is performed continuously and imperceptibly to a user within a zero-trust framework.

17. The computer program product of claim 16, wherein the acoustic communications have an authentication response that changes with each authentication.

18. The computer program product of claim 16, wherein the acoustic spread-spectrum technology comprises acoustic discrete-sequence spread-spectrum technology, and wherein synchronization codes or user code symbols used in the acoustic discrete-sequence spread-spectrum technology are changeable and programmable on subsequent authentications.

19. The computer program product of claim 16, wherein the acoustic bandwidth used for the acoustic communications is in a low ultrasound range such that the out-of-band authentication over the cross-platform acoustic transport protocol is not audible to humans with normal hearing.

* * * * *